(12) United States Patent
Ruggiero et al.

(10) Patent No.: US 10,935,964 B2
(45) Date of Patent: Mar. 2, 2021

(54) METHOD AND SYSTEM FOR OPTIMIZING A MANUFACTURING PROCESS BASED ON A SURROGATE MODEL OF A PART

(71) Applicant: General Electric Company, Schenectady, NY (US)

(72) Inventors: Eric John Ruggiero, Cincinnati, OH (US); James Tallman, Niskayuna, NY (US); Pradeep Salapakkam, Mason, OH (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 16/209,905

(22) Filed: Dec. 4, 2018

(65) Prior Publication Data

US 2020/0174456 A1    Jun. 4, 2020

(51) Int. Cl.
*G05B 19/418* (2006.01)
*G06N 20/00* (2019.01)

(52) U.S. Cl.
CPC ............. *G05B 19/41865* (2013.01); *G05B 2219/32015* (2013.01); *G05B 2219/42058* (2013.01); *G05B 2219/42155* (2013.01); *G06N 20/00* (2019.01)

(58) Field of Classification Search
CPC ........................................ G05B 2219/42058
See application file for complete search history.

(56) References Cited

U.S. PATENT DOCUMENTS

| 6,745,153 | B2 * | 6/2004 | White | B60L 3/12 |
| | | | | 340/438 |
| 6,775,647 | B1 | 8/2004 | Evans et al. | |
| 9,092,592 | B2 * | 7/2015 | Perasso | G06F 30/17 |
| 10,466,681 | B1 * | 11/2019 | Jones | G05B 19/40937 |
| 2008/0103788 | A1 * | 5/2008 | Morris | G06Q 10/04 |
| | | | | 705/306 |
| 2012/0078599 | A1 * | 3/2012 | Tryon, III | G06F 30/23 |
| | | | | 703/7 |
| 2017/0124448 | A1 | 5/2017 | Engel | |
| 2017/0323231 | A1 | 11/2017 | Johnson et al. | |
| 2017/0323239 | A1 | 11/2017 | Johnson et al. | |

(Continued)

FOREIGN PATENT DOCUMENTS

| EP | 3166052 A1 | 5/2017 |
| WO | 20160179455 A1 | 11/2016 |

OTHER PUBLICATIONS

Extended European Search Report from EP Appl. No. 19213242.1, dated Apr. 1, 2020.

*Primary Examiner* — Jennifer L Norton
(74) *Attorney, Agent, or Firm* — Wood IP LLC

(57) ABSTRACT

There is provided a method for optimizing a manufacturing process of a new part. The method includes executing, by a system configured to drive the manufacturing process, a set of manufacturing functions. Executing these functions include receiving data associated with one or more field parts similar to the new part, and generating, based on the data, a forecast representative of a longevity of the one or more parts. The method further includes generating a digital thread forming a surrogate model for the new part, based on the forecast. Further, the method includes creating the set of manufacturing functions based on the surrogate model and manufacturing the new part according to the set of manufacturing functions.

20 Claims, 4 Drawing Sheets

(56) References Cited

U.S. PATENT DOCUMENTS

| | | |
|---|---|---|
| 2017/0323240 A1 | 11/2017 | Johnson et al. |
| 2017/0323274 A1 | 11/2017 | Johnson et al. |
| 2017/0323403 A1 | 11/2017 | Johnson et al. |
| 2018/0137219 A1 | 5/2018 | Goldfarb |
| 2018/0144277 A1* | 5/2018 | Srivastava ....... G06Q 10/06315 |
| 2019/0094108 A1* | 3/2019 | Liao ................... B23Q 17/0995 |
| 2020/0173943 A1* | 6/2020 | Ruggiero ............. G01B 21/085 |
| 2020/0175438 A1* | 6/2020 | Ruggiero ............... G06Q 10/20 |

\* cited by examiner

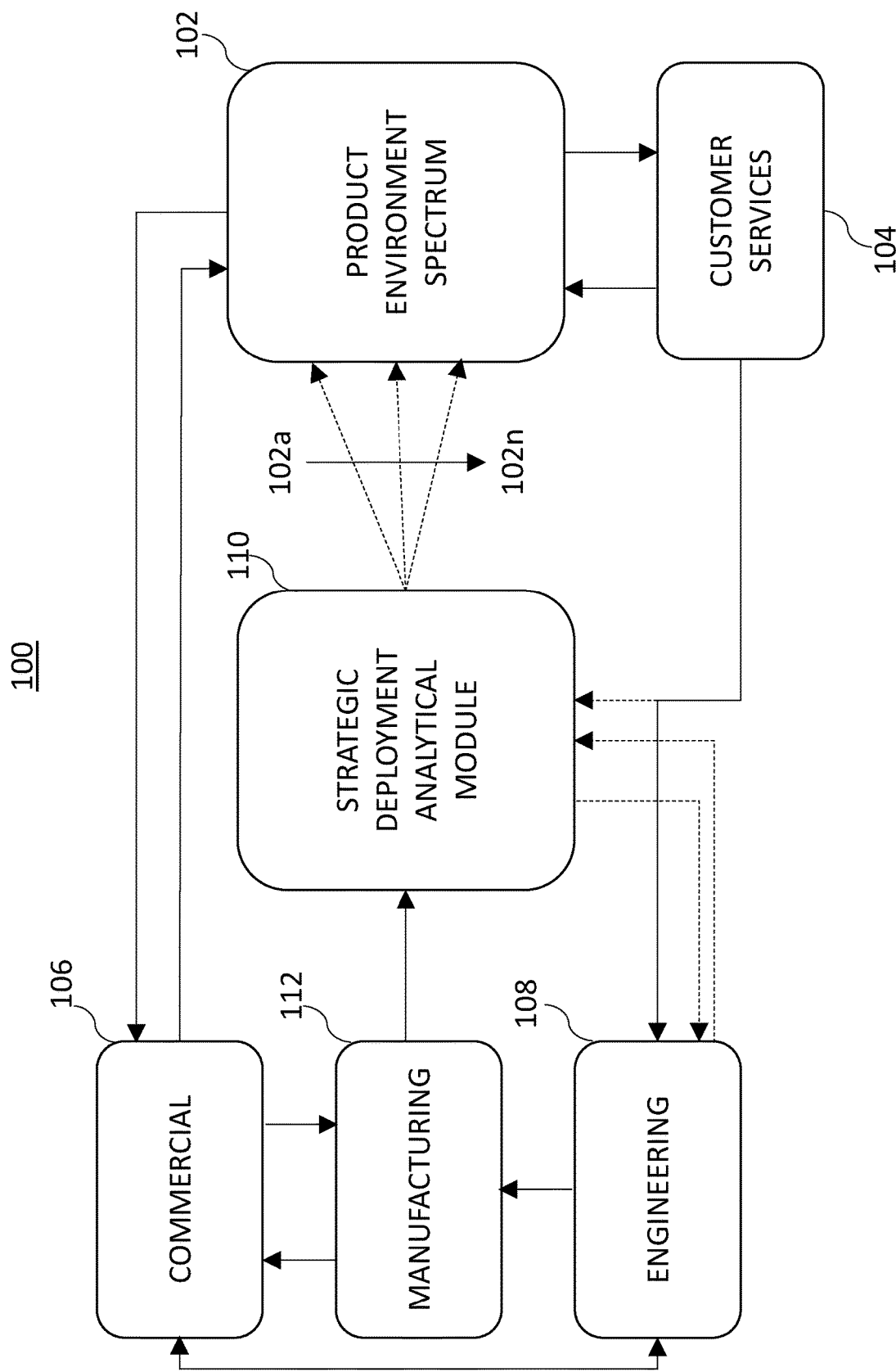

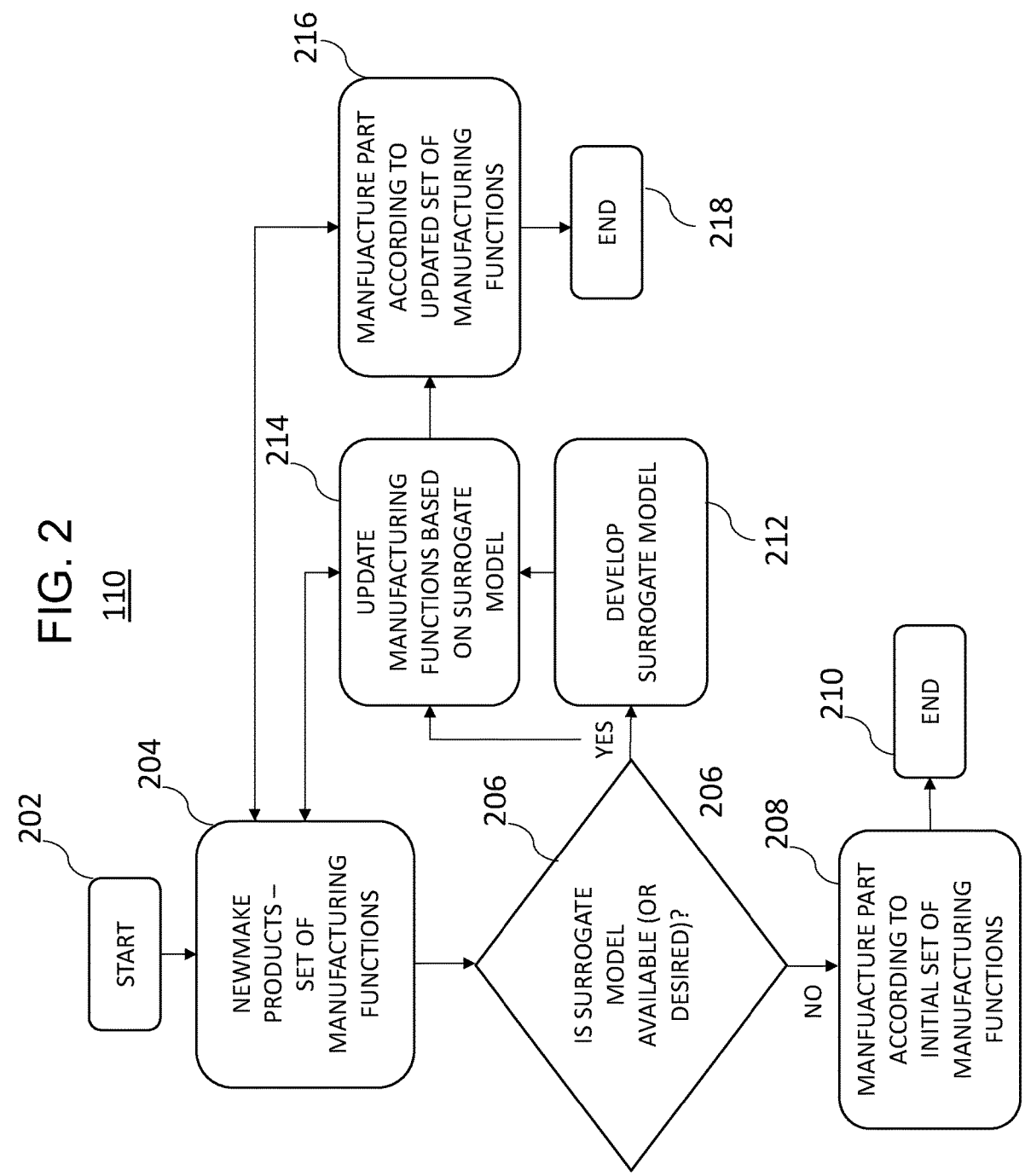

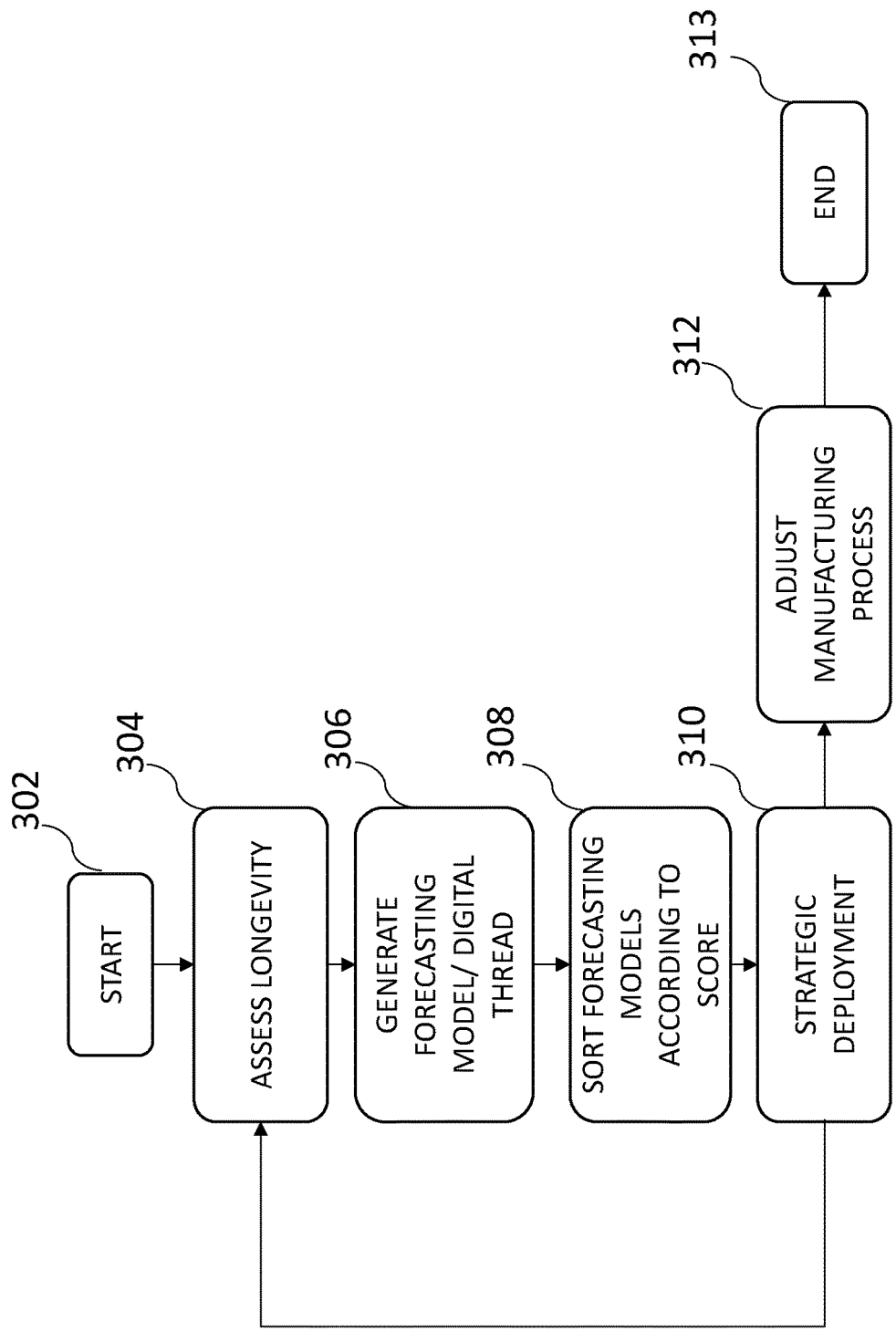

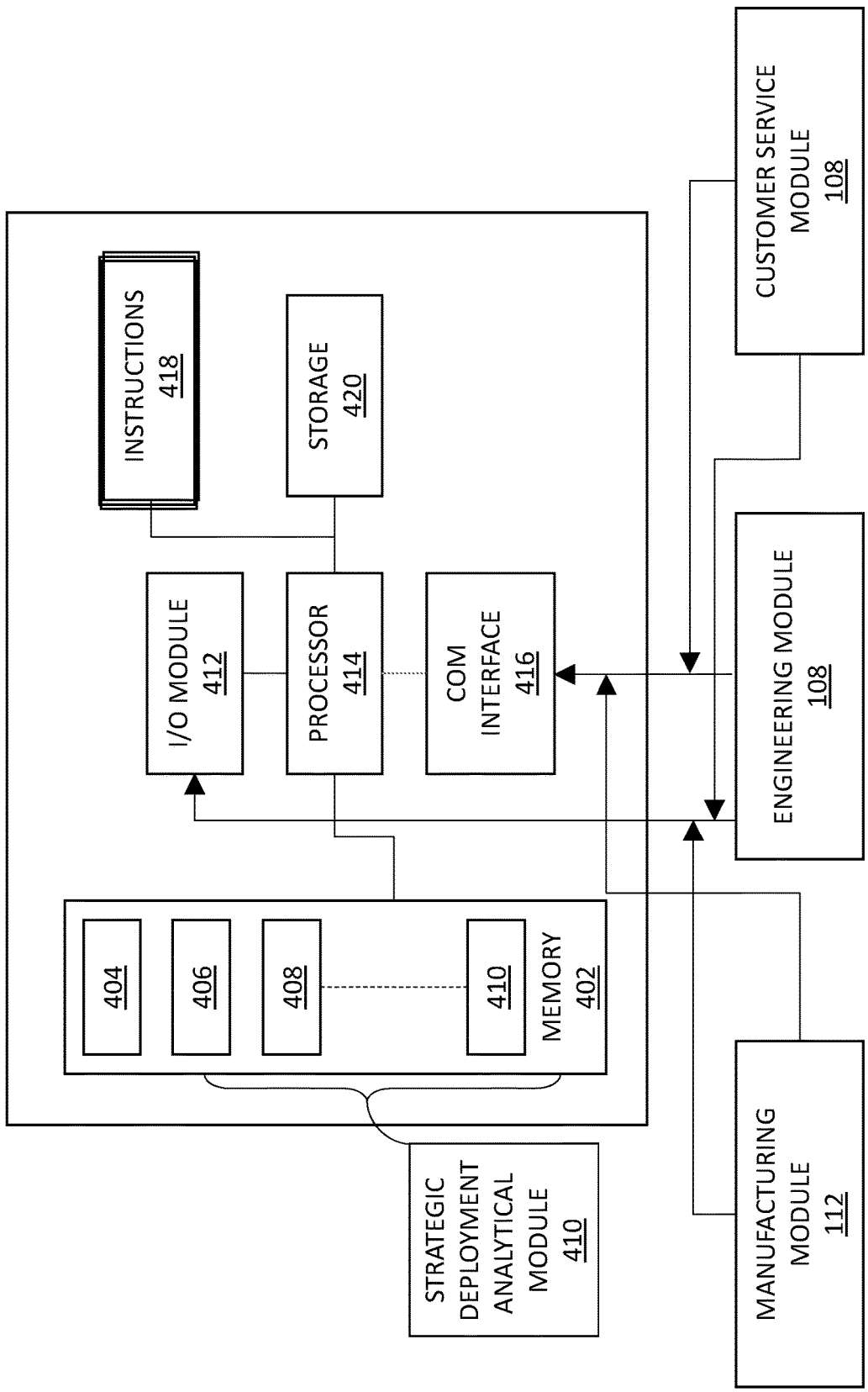

METHOD AND SYSTEM FOR OPTIMIZING A MANUFACTURING PROCESS BASED ON A SURROGATE MODEL OF A PART

TECHNICAL FIELD

The present disclosure generally relates to manufacturing processes. More particularly, the present disclosure relates to a system and a method for optimizing a manufacturing process based on a surrogate model of a part.

BACKGROUND

The typical lifecycle earnings curve of a newly launched product may exhibit three distinct phases. The first phase, which is the earliest, typically includes early field experiences in which customers adopt and evaluate product, and the manufacturer of the product gathers data regarding commercial and technical aspects of the product's in-field use. In the first phase, the manufacturer's earnings are typically negative, as the cost of manufacturing and deploying the product may exceed the revenues generated from early-adopting customers. The second phase, which typically begins at the point where earnings become positive, includes a high growth phase where the product is adopted by many customers and earnings grow at a rapid pace. In the third phase, a plateau in the earnings is typically observed, which suggests that the product has reached its maximum market potential.

From a manufacturer's perspective, one of the key goals of a typical manufacturing processes is to provide value to customers. As such, parts are typically designed to provide the maximum durability possible, and typical manufacturing processes are optimized accordingly. However, typical manufacturing processes lack the capability to favorably alter the earning's curve without compromising durability. In other words, typical manufacturing processes cannot favorably mitigate costs without compromising performance.

SUMMARY

The embodiments featured herein help solve or mitigate the above-noted issues as well as other issues known in the art. The embodiments allow the optimization of two or more aspects of a manufacturing process. For example, the embodiments allow the manufacturing process of a part to be optimized for manufacturing cost without adversely affecting performance, and in some cases, the embodiments may even mitigate costs while enhancing durability via strategic deployment of components.

Two non-limiting example embodiments that may provide the aforementioned example advantages are described hereinafter. For example, one embodiment provides a method for optimizing a manufacturing process of a new part. The method includes executing, by a system configured to drive the manufacturing process, a set of manufacturing functions. Executing these functions include receiving data associated with one or more fielded parts similar to the new part, and generating, based on the data, a forecast representative of a longevity of the one or more fielded parts. The method further includes generating a digital thread forming a surrogate model for the new part based on the forecast. Further, the method includes creating the set of manufacturing functions based on the surrogate model and manufacturing the new part according to the set of manufacturing functions.

Another embodiment provides a system for optimizing a manufacturing process of a new part. The system includes a processor and a memory including instructions that, when executed by the processor, cause the processor to perform operations including executing a set of manufacturing functions. Executing these functions include receiving data associated with one or more fielded parts similar to the new part and generating, based on the data, a forecast representative of a longevity of the one or more fielded parts. The operations further include generating a digital thread forming a surrogate model for the new part based on the forecast and creating the set of manufacturing functions based on the surrogate model. Furthermore, the operations include manufacturing the new part according to the set of manufacturing functions.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings.

Furthermore, the drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 1 illustrates a process according to an embodiment.
FIG. 2 illustrates a method according to an embodiment.
FIG. 3 illustrates a method according to an embodiment.
FIG. 4 illustrates a system according to an embodiment.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

An embodiment provided can include a system that is specifically configured to perform manufacturing optimization. For example, and not by limitation, such a system may be configured to provide a surrogate model for driving an optimized manufacturing process. The surrogate model may be generated from running one or more machine learning algorithms using inputs such as manufacturing parameters, environmental factors, customer de-rate, and route structures. The one or more machine learning algorithms may then predict the expected life of one or more subsystems of a component.

For example, and not by limitation, the one or more machine learning algorithms may provide a predictive model of a hot gas path component for a given customer and Engine Serial Number (ESN). The surrogate model may take in the new manufacturing parameters, expected route structures, customer de-rate, and environmental factors and make a recommendations that mitigates a trade-off typically encountered in the manufacturing process. One such trade-off may be, without limitation, the manufacturing cost versus the expected durability of the component. In yet other embodiments, the surrogate model may be representative of a component in a cold section of an engine. For example, and not by limitation, such a component may be compressor blades, fan blades, or fuel nozzles.

Generally, the surrogate model may be trained through algorithms based on machine learning and/or the transfer function between manufacturing parameters (e.g., laser settings, part rotation speeds, Electrical Discharge Machining (EDM) burn rates) and component robustness (or durability). Once established, the same surrogate model can be used to discern components of similar quality, which can then be kitted for a specific customer and/or for a specific application. Furthermore, without loss of generality, a kitting algorithm yielding a set of manufacturing functions according to an embodiment may not necessarily optimize the process to maximize time-on-wing alone. Instead, time-on-wing as well as manufacturing costs may be optimized together to provide value for both the customer and the manufacturer under a given customer service agreement contract (CSA).

FIG. 1 illustrates a process 100 in accordance with an exemplary embodiment. The process 100 may be an example process associated with the lifecycle of a component and/or a general manufacturing cycle. While the process 100 is described in the context of airplane or jet engine parts, it may extend to the manufacture or in general to the lifecycle of any manufactured component. The process 100 includes a module 102 that is a product environment spectrum. In other words, the module 102 can be a database that stores information of about one or more instances of the same product as they are used in the field.

For example, the module 102 may include information about the reliability or failure of a plurality of turbine blades as they are commissioned in a fleet of engines (i.e., in two or more engines, or generally on two or more planes). The module 102 may be configured to organize, or present upon request from a device communicatively coupled thereto, a product environment spectrum which sorts all of the products of interest in a predetermined order. For example, the products may be sorted from best performing (102a) to worst performing (102n). Generally, one or more criteria may be used to sort these products according to the aforementioned spectrum. For example, in the case of a hot gas path component of an engine, the products may be sorted according to their thermal performance, which may be measured using one or more field inspection methods or derivatives thereof.

The product environment spectrum may be driven by constraints from customers, which may be collected and functionalized (i.e., put in the form of computer instructions) in the module 104. Similarly, the product environment spectrum may be driven by commercial constraints, which may be functionalized in the module 106.

The customer constraints of the module 104 may also drive the engineering functions of the module 108, which in turn drive the manufacturing decisions, as functionalized in the module 112. The process 100 further includes a strategic deployment analytical module 110, which is an analytics module that can output a surrogate model to further alter the engineering decisions of the module 108 and consequently produce a new set of manufacturing functions at the module 112. For example, and not by limitation, the surrogate model may be associated with an engine component such as a hot gas path of an engine. Further, the analytics module may include a machine learning module, which transforms and generates data for the surrogate model based on training and adaptation.

Furthermore, the new set of manufacturing functions may represent an optimized set of manufacturing functions relative to another of set of manufacturing functions that are not based on the surrogate model. For instance, the set of manufacturing functions may be a manufacturing process to provides both a better part (i.e., with durability tuned specifically for the application in which the part is to be used) and an optimized cost for manufacturing the part. In contrast, a typical manufacturing process would only be optimized based on physical parameters.

The analytical module 110 may be configured to provide the surrogate model via training, for example based on one or more transfer functions that relate one or more manufacturing parameters with performance metrics of the part, such as, for example, the part's robustness or durability. In one general non-limiting example, the analytics module may be configured to provide the surrogate model based on a set of manufacturing parameters, laser settings, part rotation speeds, EDM burn rates, and the robustness of the part. The analytics module provides the surrogate model without using a physics-based model of the part.

FIG. 2 illustrates an exemplary method that may be executed by the analytical module 110 and integrated within the process 100. The method is described, for illustrations purposes only, in the context of the manufacture a hot gas path component of an engine. However, the exemplary method can be adapted to the manufacture of any part. The method begins at the step 202, and it includes setting up manufacturing directives for making a new part (step 204). These directives may initially include a set of manufacturing functions for making the new part based on geometrical constraints or generally based on a physics-based model. The method may then move to step 206 to check whether a surrogate model is available. If the model does not exist in a memory or database of the manufacturing system or it is not desired to use such a model (NO at step 206), the method continues to step 208 and the part is manufactured according to the initial set of manufacturing functions, and the method may then end at step 210.

In contrast, if a surrogate model is found at step 206 (YES), the method moves to step 214 and the initial set of manufacturing functions is updated. The method then moves to step 214 where the manufacturing system manufactures the new part based on the updated set of manufacturing functions, which are based on the surrogate model. The method ends at step 218. Alternatively, if there is no surrogate model but one is desired (also a YES at step 206), the method moves to step 212 where the model is developed using training from various data relating to manufacturing parameters, customer constraints, performance data, as described above. Steps 214 and 216 are then undertaken to fabricate the new part according to new manufacturing functions based on the developed surrogate model. The method then ends at step 218.

FIG. 3 illustrates another method 300 according to one embodiment. The method 300 may be executed by a manufacturing system in order to assess the performance of field parts and/or configure a manufacturing process to produce a new part according based on the information from various data sources, as shall be described below. For example, and without limitation, the new part described in the method 300 may be a turbine airfoil. Generally, the new part may be intended to be one of several like parts within a system, such as an engine. The method 300 begins at step 302 where the anticipated longevity of a set of parts that are already fielded is assessed. For example, the set of parts already fielded may be a set of turbine airfoils similar the one that is to be made, i.e. similar to the new part. The longevity of each of the set of parts of already fielded may be assessed via a field inspection which may be full or partial. Generally, the field inspection may be a functional inspection of the parts.

At step 304, the data gathered from the inspection may be used to generate a forecasting model for each of the individual parts. For example, and not by limitation, this forecasting model could be physics-based, surrogate-based, machine learning-based, or correlation-based. The forecasting model may include a score for each part, as shown in FIG. 1 in the context of the module 102. At step 306, the method 300 includes digitally threading each individual part's score into a digital environment to form a fielded part ecosystem. Furthermore, at step 308 the method 300 includes sorting their scores according to their anticipated longevity.

Once the parts are scored according to longevity, the method 300 can instruct a management system to deploy parts with better scores into harder or harsher working environments (step 310). In other words, the forecasting model may be used to anticipate the longevity of each part in its assigned deployment environment, i.e., where the engine will go and how the engine will be operated. And as such, each engine may be assigned a specific deployment environment with a given confidence level. The aforementioned steps may then be repeated for different parts of any specific engine.

The method 300 may further include, at step 310, gathering the outputs of the forecasting models in step 306 for several of the parts in the system and assess based on the individual forecasted longevities, the overall longevity of the entire system. This may be done, for example, by identifying the weakest link of the system, i.e., the part having the shortest anticipated longevity and thus assigning that longevity to the entire system. The method 300 may further include building and deploying engines using the sorted part distributions from steps 306-308.

The method 300 may include steps that focus on monitoring the deployed parts and their longevity in the field. This relates back to step 304 where different longevities of fielded parts are monitored. In some embodiments, machine learning may be used so that the monitored field data are used to evolve/update the forecasting model in time. In some embodiments, this updating may be done in real time, in other embodiments it may be done periodically.

At step 310, the method 300 includes making adjustments to the manufacturing processes associated with any or all of the parts in the engine system (i.e., with one part, all parts, or selected parts). This may include quantifying cost changes associated with changing each manufacturing process. Furthermore, this may include manufacturing a statistical sample of each part with the adjusted manufacturing process and functionally inspect the sample parts for each part being adjusted. The data from the functional inspection may then be used for each as-manufactured part into the forecasting model from step 304.

At this point, the method 300 may then include returning to step 304 with the alternative as-manufactured information from the step 310. In one embodiment, one target outcome would be to have all the parts in an engine ending their useful life at the same time. In another embodiment, a target outcome would be for all of the engines ending their useful life at the same time. Yet in another embodiment, would be to have a combination of both of the aforementioned scenarios. In yet another embodiment, the outcome would be to have a desired statistical distribution of anticipated operational longevity such that one might install a set of new-make part type (e.g. the turbine airfoils) that forecast to have a longevity of 1000 operating cycles into already in-service engine that forecasts to have the same i.e. 1,000 operating cycles remaining in its useful life. These findings may then be absorbed into the manufacturing process (step 312). The method 300 ends at step 313.

Having described methods and processes, an application-specific system that is configured to carry out these processes and methods is now described. FIG. 4 depicts a system 400 that includes an application-specific processor 414 configured to perform tasks specific to optimizing a manufacturing process based on a surrogate model. The processor 414 may be part of or it may be wirelessly coupled to a cloud-based infrastructure. The processor 414 has a specific structure imparted by instructions stored in a memory 402 and/or by instructions 418 that can be fetched by the processor 414 from a storage 420. The storage 420 may be co-located with the processor 414, or it may be located elsewhere and be communicatively coupled to the processor 414 via a communication interface 416, for example.

The system 400 can be a stand-alone programmable system, or it can be a programmable module located in a much larger system. For example, the system 400 can be part of a distributed system configured to handle the various modules of the process 100 described above. The processor 414 may include one or more hardware and/or software components configured to fetch, decode, execute, store, analyze, distribute, evaluate, and/or categorize information. Furthermore, the processor 414 can include an input/output module (I/O module 412) that can be configured to ingest data pertaining to single assets or fleets of assets. The processor 414 may include one or more processing devices or cores (not shown). In some embodiments, the processor 414 may be a plurality of processors, each having either one or more cores. The processor 414 can be configured to execute instructions fetched from the memory 402, i.e. from one of memory block 404, memory block 406, memory block 408, and memory block 410.

Furthermore, without loss of generality, the storage 420 and/or the memory 402 may include a volatile or non-volatile, magnetic, semiconductor, tape, optical, removable, non-removable, read-only, random-access, or any type of non-transitory computer-readable computer medium. The storage 420 may be configured to log data processed, recorded, or collected during the operation of the processor 414. The data may be time-stamped, location-stamped, cataloged, indexed, or organized in a variety of ways consistent with data storage practice. The storage 420 and/or the memory 402 may include programs and/or other information that may be used by the processor 414 to perform tasks consistent with those described herein.

For example, the processor 414 may be configured by instructions from the memory block 406, the memory block 408, and the memory block 410, which may form the analytical module 110 described above, to generate a surrogate model in order to optimize a manufacturing process for both cost and durability. The processor 414 may execute the aforementioned instructions from memory blocks, 406, 408, and 410. The processor 414 may then output a set of manufacturing instructions that optimizes the process based on cost and durability. Generally, the operations performed by the processor upon executing the instructions from the memory blocks 406, 408, and 410 may include constructing a set of manufacturing functions based on a recommendation fetched from a canvas of information originating from at least one of the manufacturing module 112, the engineering module 108, and the customer service module 104. The operations can further include communicating at least one of a manufacturing parameter, an environmental factor, a customer de-rate, and a route structure to an analytics module of the system. And the operations can include generating the recommendation based on a surrogate model of the part outputted by the analytics module.

Generally, the embodiments provide significant advantages over typical optimization techniques used when optimizing manufacturing processes. For example, and not by limitation, they embodiments provide a non-physics-based means for optimization of a manufacturing process, thereby allowing improved manufacturing based on performance, part usage, environmental factors, and other in-field constraints.

For example, one embodiment provides a method for optimizing a manufacturing process of a part. The method includes executing, by a system configured to drive the manufacturing process, a set of manufacturing functions based on a recommendation. The execution includes communicating at least one of a manufacturing parameter, an environmental factor, a customer de-rate, and a route structure to an analytics module of the system. Furthermore, the execution includes generating the recommendation based on a surrogate model of the part, the surrogate model being outputted by the analytics module.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for optimizing a manufacturing process of a new part, the method comprising:
executing, by a system configured to drive the manufacturing process, a set of manufacturing functions, the executing including:
receiving data associated with one or more fielded parts similar to the new part;
generating, based on the data, a forecast representative of a longevity of the one or more fielded parts;
generating a digital thread forming a surrogate model for the new part, based on the forecast;
creating the set of manufacturing functions based on the surrogate model; and
manufacturing the new part according to the set of manufacturing functions.

2. The method of claim 1, wherein the surrogate model is associated with an engine component.

3. The method of claim 1, wherein the surrogate model is associated with a component in a hot gas path of an engine or with a cold section of the engine.

4. The method of claim 1, wherein the surrogate model is updated according to a machine learning model.

5. The method of claim 1, wherein the set of manufacturing functions represent an optimized set of manufacturing functions relative to another of set of manufacturing functions that are not based on the surrogate model.

6. The method of claim 1, further comprising executing analytics module configured to update the surrogate model via training.

7. The method of claim 6, wherein the analytics module is configured to update the surrogate model based on a transfer function of a set of manufacturing parameters and a robustness of the one or more fielded parts.

8. The method of claim 6, wherein the analytics module is configured to update the surrogate model based on a set of manufacturing parameters, laser settings, part rotation speeds, Electrical Discharge Machining (EDM) burn rates, and a robustness metric.

9. The method of claim 6, wherein the analytics module is configured to update the surrogate model without using a physics-based model of the new part.

10. A system for optimizing a manufacturing process of a new part, the system comprising:
a processor;
a memory including instructions that, when executed by the processor, cause the processor to perform operations including:
executing a set of manufacturing functions, the executing including:
receiving data associated with one or more fielded parts similar to the new part;
generating, based on the data, a forecast representative of a longevity of the one or more fielded parts;
generating a digital thread forming a surrogate model for the new part, based on the forecast;
creating the set of manufacturing functions based on the surrogate model; and
manufacturing the new part according to the set of manufacturing functions.

11. The system of claim 10, wherein the surrogate model is associated with an engine component.

12. The system of claim 10, wherein the surrogate model is associated with a component of a hot gas path of an engine or with a cold section of the engine.

13. The system of claim 10, wherein the surrogate model is associated with an engine component.

14. The system of claim 10, wherein the surrogate model is associated with a subsystem of an engine.

15. The system of claim 10, wherein the operations further include executing an analytics module including a machine learning module.

16. The system of claim 10, wherein the set of manufacturing functions represent an optimized set of manufacturing functions relative to another of set of manufacturing functions that are not based on the surrogate model.

17. The system of claim 15, wherein the analytics module is configured to update the surrogate model via training.

18. The system of claim 15, wherein the analytics module is configured to update the surrogate model based on a transfer function of a set of manufacturing parameters and a robustness of the one or more fielded parts.

19. The system of claim 15, wherein the analytics module is configured to update the surrogate model based on a set of manufacturing parameters, laser settings, part rotation speeds, Electrical Discharge Machining (EDM) burn rates, and a robustness metric.

20. The system of claim 15, wherein the analytics module is configured to update the surrogate model without using a physics-based model of the new part.

* * * * *